Nov. 10, 1953 K. JOHANSON 2,658,719
MOUNTING AND FIXING OF TURBO-MACHINE FIXED BLADES
Filed Oct. 17, 1950
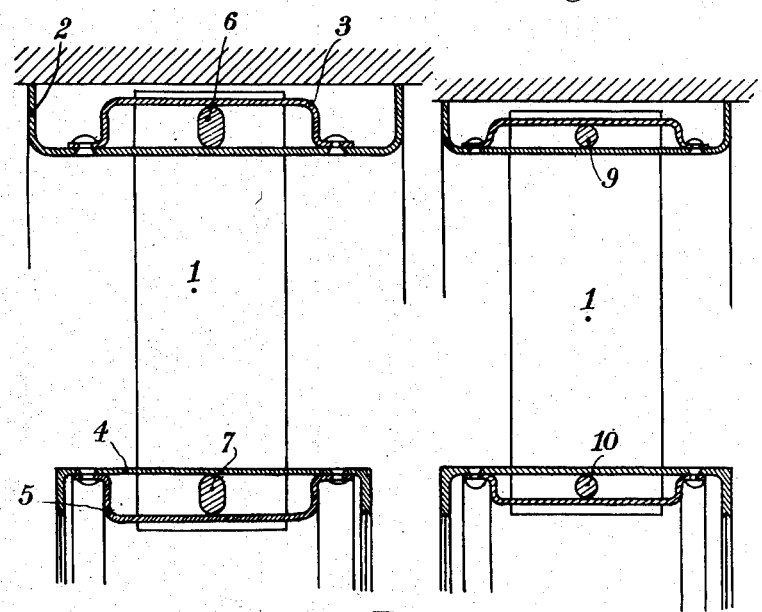
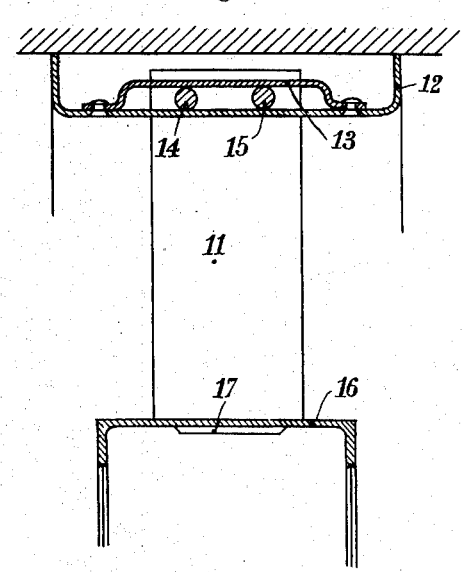
Inventor
Knut Johanson
By Robert E. Burns
Attorney

UNITED STATES PATENT OFFICE 2,658,719

MOUNTING AND FIXING OF TURBO-MACHINE FIXED BLADES

Knut Johanson, Montigny-les-Cormeilles, France, assignor, by mesne assignments, to Société Anonyme so-called: Compagnie Electro-Mecanique, Paris, France, a French corporation Application October 17, 1950, Serial No. 190,521
Claims priority, application France October 26, 1949

4 Claims. (Cl. 253—78)

The present invention has for its object improvements in the mounting and fixing of turbo-machine fixed blades and is characterized thereby that the blades are secured in rings at least one of which is composed of a pair of concentric U-section rings in the webs of which apertures are provided, the shape and size of which conform to the outline of the blades, thus making it possible to insert the latter radially, and assembled in concentric relation to each other by riveting, welding or any other known method so that an annular chamber is delimited therebetween through which extend one or several rings threaded through holes provided for that purpose in the blades and by means of which rings said blades are locked in position. Contingently, the rings may be replaced by wires.

The invention will be described more specifically hereinafter, reference being had to the appended drawing which illustrates an example of the mounting of the fixed blades in an axial compressor and in which:

Figure 1 is a longitudinal sectional view showing the mounting of the blades in a ring and the locking of the same with the aid of rings.

Figure 2 is a longitudinal sectional view showing the mounting of the blades in a ring and the locking of the same with the aid of round wires.

Figure 3 is a longitudinal sectional view showing a blade mounted in a ring according to the invention only at the one end of it while its other end is fitted in a simple ring and secured thereto by any known means such as welding, caulking or the like.

The blade 1 (see Fig. 1) projects through the inner portion 2 and the outer portion 3 of the outer ring, which are interconnected by riveting or welding or any other known means and which are provided with apertures conforming the shape and size of the transversal outline of the blade. The same construction and mounting may be resorted to with respect to the inner ring through the portions 4, 5 of which the blade projects owing to the presence of apertures similar to those provided in the outer ring. The blades are locked in position by means of rings 6, 7 the height of which is equal to the depth of the annular space delimited between the elements 2, 3 of the outer ring and the elements 4, 6 of the inner ring and which are threaded through holes of corresponding size provided in the blades.

Such a structure is extremely stiff and allows quite readily to mount and dismount the blades whenever necessary.

A similar assemblage is shown in Fig. 2 where the blades 1 are locked in position by simple wires 9, 10.

Fig. 3 illustrates a mixed arrangement. The blades 11 are locked in an outer ring 12—13 according to the invention, in which ring a pair of blade-locking wire hoops 14, 15 are retained, and in an inner ring 16 of conventional design in which they are secured by caulking or welding of the end portions 17 of the blades.

It remains within the scope of the invention to use similar locking means in connection with blades which are not provided with covering bands at their free ends.

What I claim is:

1. In a turbo-machine, means for removably but lockingly securing the blades of the machine, said means comprising a pair of rings for receiving the respective ends of the blades, at least one of said rings being formed from a first annular member of channel-shaped cross section having a base portion and arm portions and a second annular member of channel-shaped cross section having a base portion and arm portions positioned between the arm portions of and secured to said first member, said first member having its arm portions directed radially outwardly and said second member having its arm portions directed radially inwardly whereby a closed annular channel is defined between the base of the first member and the base of the second member, the bases of said first member and said second member being provided with aligned slots for receiving said blades of the machine, said blades being of uniform cross section substantially throughout their length and said slots corresponding in cross-section to the cross-section of said blades, each of said blades being provided with at least one aperture having a width in the radial direction of the blade equal to the distance between the bases of said first member and said second member and spaced inwardly from the end of the blade to coincide with said annular channel when the blade extends through the slots in said first member and in said second member, and a locking ring passing through said aperture in each blade, said blades being thereby lockingly secured to said ring but being removable therefrom merely by withdrawal of said locking ring.

2. In a turbo-machine, means for removably but lockingly securing the blades of the machine, said means comprising a pair of rings for receiving the respective ends of the blades, at least one of said rings being formed from a first annular member of channel-shaped cross section having a base portion and arm portions and a second annular member of channel-shaped cross section having a base portion and arm portions positioned between the arm portions of and secured to said first memebr, said first member having its arm portions directed radially outwardly and said second member having its arm portions directed radially inwardly whereby a closed annular channel is defined between the base of the first member and the base of the second member, the bases of said first member and said second member being provided with aligned slots for receiving said blades of the machine, said blades being of uniform cross-section substantially throughout their length and said slots corresponding in cross-section to the cross-section of said blades, each of said blades being provided with at least one aperture having a width in the radial direction of the blade equal to the distance between the bases of said first member and said second member and spaced inwardly from the end of the blade to coincide with said annular channel when the blade extends through the slots in said first member and in said second member, and a locking ring corresponding in shape to the shape of said aperture passing through the said aperture in each blade, said locking ring thereby filling the radial space between the bases of said first member and said second member in the area of said aperture, said blades being thereby lockingly secured to said ring but being removable therefrom merely by withdrawal of said locking ring.

3. Means for removably but lockingly securing the fixed blades of a turbo-machine as defined in claim 1, wherein said locking ring is formed from wire of circular cross-section.

4. In a turbo-machine, means for removably but lockingly securing the radially outer ends of the blades of the machine, said means comprising a pair of rings for receiving the respective ends of the blades, at least one of said rings being formed from a first annular member of channel-shaped cross section having a base portion and arm portions and a second annular member of channel-shaped cross section having a base portion and arm portions positioned between the arm portions of and secured to said first member, said first member having its arm portions directed radially outwardly and said second member having its arm portions directed radially inwardly whereby a closed annular channel is defined between the base of the first member and the base of the second member, the bases of said first member and said second member being provided with aligned slots for receiving said blades of the machine, said blades being of uniform cross section substantially throughout their length and said slots corresponding in cross-section to the cross-section of said blades, each of said blades being provided with at least one aperture having a width in the radial direction of the blade equal to the distance between the bases of said first member and said second member and spaced inwardly from the end of the blade to coincide with said annular channel when the blade extends through the slots in said first member and in said second member, and a locking ring passing through said aperture in each blade, said blades being thereby lockingly secured to said ring but being removable therefrom merely by withdrawal of said locking ring.

KNUT JOHANSON.

References Cited in the file of this patent

UNITED STATES PATENTS

| Number | Name | Date |
|---|---|---|
| 764,450 | Geisenhoner | July 5, 1904 |
| 900,739 | Jude et al. | Oct. 13, 1908 |
| 1,050,187 | Westinghouse | Jan. 14, 1913 |

FOREIGN PATENTS

| Number | Country | Date |
|---|---|---|
| 267,405 | Great Britain | Mar. 17, 1927 |